Patented May 22, 1928.

1,670,825

UNITED STATES PATENT OFFICE.

HANS RUPE, OF BASEL, SWITZERLAND, ASSIGNOR TO SOCIETY OF CHEMICAL INDUSTRY IN BASLE, OF BASEL, SWITZERLAND.

UNSATURATED ALDEHYDES AND IN THE MANUFACTURE THEREOF.

No Drawing. Application filed March 11, 1927, Serial No. 174,702, and in Switzerland March 22, 1926.

This invention relates to unsaturated aldehydes and it comprises the process for the manufacture thereof, as well as the new products themselves.

It has been found that unsaturated aldehydes of considerable technical value, especially as perfumes or intermediate products for the preparation of synthetic drugs, are obtained by treating acetylene alcohols, which contain a free hydrogen atom in the acetylene group, with compounds containing an acid radical.

For example, when 1-ethinylcyclohexanol- (1)

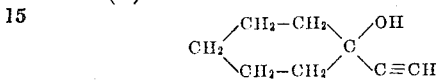

is treated with formic acid, acetic acid, hydrochloric acid, sulphuric acid, acetic acid anhydride or other soluble bodies having an acid radical, it yields the cyclohexylideneacetaldehyde of the formula

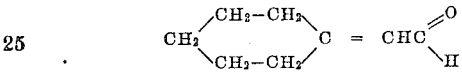

Analogous aldehydes may be obtained from other cyclic or aliphatic or aromaticaliphatic acetylene alcohols with terminal acetyl groups. Thus, for instance, from ethinyl-methylphenylcarbinol there may be produced β-methylcinnamic aldehyde; from ethinyl-dimethylcarbinol the isopropylidene-acetaldehyde; from ethinyl-ethylmethylcarbinol the sec. butylidene-acetaldehyde, from ethinyl-methyl-isobutyl-carbinol the methyl-isoamyliden-acetaldehyde, and so on.

The acetylene alcohols which serve as parent materials can be made by the known processes from ketones and acetylenes (compare, for instance, Liebig's Annalen 308 (1899), page 264), particularly by the action of an acetylene on the sodium compound of a ketone (compare Comptes Rendus 174, (1922) 1427; Bull. Soc. Chim. (4) 35, 597, 604).

The new compounds possess a very characteristic strong smell and are thus applicable for the manufacture of perfumes. They are further characterized by a very remarkable degree of reactivity and may thus serve as intermediates for the preparation of all kinds of synthetic products, f. i. synthetic drugs.

The following example illustrates the invention:—

1 part by weight of 1-ethinylcyclohexanol- (1) (Bull. Soc. Chim. (4) 35, 597) is cautiously warmed with 4-5 parts by volume of formic acid of 85 per cent strength in a reflux apparatus until reaction begins. The heating is then interrupted, the mixture begins spontaneously to boil vigorously, the temperature at first rising to the boiling point of formic acid, but afterwards falling before the conclusion of the reaction. When the spontaneous reaction is at an end, the mixture is boiled, then cooled and poured into water. The formic acid is cautiously neutralized by means of sodium carbonate and the desired aldehyde is either extracted by means of ether or distilled with steam. It is purified by distillation under diminished pressure. If it is desired to purify the aldehyde still further, this may be done in known manner by means of the bisulphite compound or the semicarbazone or the oxime.

The cyclohexylidene-acetaldehyde thus obtained is an oil having an odour which is a mixture of those of peppermint, benzaldehyde and mesityloxide; it boils at 78–80° C. under 10–11 mm. pressure and yields a semicarbazone of melting point 200–205° C.

In similar manner there may be obtained from 1-ethinyl-3-methylcyclohexanol- (1) (boiling point 76–78° C. under 10 mm. pressure; melting point 77.5° C.) the 3-methylcyclohexylidene-acetaldehyde

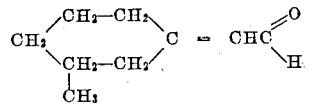

which boils at 83–85° C. under 10 mm. pressure and has an odour similar to that of the aldehyde described in the above example. Its semicarbazone melts at 203° C.

1-ethinyl-2-methyl-5-isopropyl-cyclohexanol- (1) (boiling point 108–109° C. under 11 mm. pressure) yields the 2-methyl-5-isopropyl-cyclohexylidene-acetaldehyde

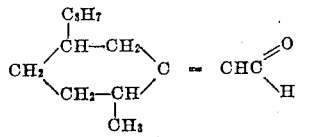

which boils at 115° C. under 9.5 mm. pressure and forms a semicarbazone of melting point 140.5° C.

Ethinyl-dimethyl-carbinol (compare Liebig's Annalen 442, page 79) yields the isopropylidene-acetaldehyde

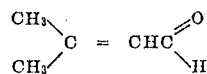

whose semicarbazone melts at 244° C.

From ethinyl-methyl-ethyl-carbinol (compare Liebig's Annalen 442, page 80) there is obtained the sec. butylidene-acetaldehyde

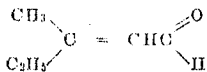

which boils at 133–134° C. and forms a semicarbazone of melting point 170° C.

Ethinyl-methyl-isobutyl-carbinol (boiling point 155–156° C. at atmospheric pressure) yields the methyl-isoamylidene-acetaldehyde

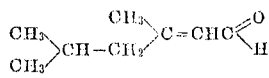

which boils at about 115° C. under 64 mm. pressure and between 56–64 mm. under 12 mm. pressure. It probably consists of two stereoisomerides yielding two different semicarbazones of the melting points 176–177° and 135–136° respectively. The two stereoisomerides may be separated by means of alkali bisulfite.

Ethinyl-methyl-isohexyl-carbinol (compare Ann. de Chimie 1924, page 369) yields the methyl-isoheptylidene-acetaldehyde

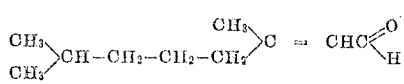

boiling at 85–86° C. under 9 mm. pressure and yielding a semicarbazone of the melting point 170° C.

What I claim is:—

1. A process for the manufacture of unsaturated aldehydes by treating acetylene alcohols which contain a free hydrogen atom in the acetylene group, with a soluble body containing an acid radical.

2. A process for the manufacture of unsaturated aldehydes containing the group

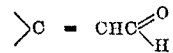

by treating acetylene alcohols containing the group

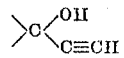

wherein the free valences are each saturated by a hydrocarbon radical, with a body containing an acid radical.

3. As new products the herein described unsaturated aldehydes which possess at least one double bond situated between the two carbon atoms being in the α and β position to the aldehyde group and which constitute bodies of a characteristic odour and are useful as perfumes or as intermediate products for the preparation of pharmaceutical and other synthetic products.

4. As new products the herein described unsaturated aldehydes which contain the group

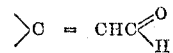

wherein the free valences are each saturated by a hydrocarbon radical, and which constitute bodies of a characteristic odour and are useful as perfumes or as intermediate products for the preparation of pharmaceutical and other synthetic products.

In witness whereof I have hereunto signed my name this 1st day of March, 1927.

HANS RUPE.